(12) United States Patent
Kulkarni et al.

(10) Patent No.: US 7,653,650 B2
(45) Date of Patent: Jan. 26, 2010

(54) APPARATUS, SYSTEM, AND METHOD FOR SYNCHRONIZING CHANGE HISTORIES IN ENTERPRISE APPLICATIONS

(75) Inventors: Zeenat Lainwala Kulkarni, Foster City, CA (US); Edwin V. Sapugay, San Mateo, CA (US); Olga Pavlovna Tikhonova, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/301,738

(22) Filed: Dec. 13, 2005

(65) Prior Publication Data

US 2007/0136396 A1    Jun. 14, 2007

(51) Int. Cl.
*G06F 17/00* (2006.01)
*G06F 7/00* (2006.01)

(52) U.S. Cl. .................................. 707/102; 707/103 R

(58) Field of Classification Search .................. 705/56, 705/64, 74; 715/769
See application file for complete search history.

(56) References Cited

U.S. PATENT DOCUMENTS

| | | | | |
|---|---|---|---|---|
| 5,787,232 | A | | 7/1998 | Greiner et al. ................. 395/10 |
| 6,141,323 | A | * | 10/2000 | Rusu et al. .................. 370/236 |
| 6,151,973 | A | * | 11/2000 | Geysen et al. .............. 73/865.8 |
| 6,167,316 | A | * | 12/2000 | Gloudeman et al. ............. 700/2 |
| 6,205,478 | B1 | * | 3/2001 | Sugano et al. ............... 709/223 |
| 6,374,267 | B1 | * | 4/2002 | Tam ........................... 707/204 |
| 6,397,379 | B1 | * | 5/2002 | Yates et al. .................. 717/140 |
| 6,411,969 | B1 | * | 6/2002 | Tam ........................... 707/204 |
| 6,470,306 | B1 | | 10/2002 | Pringle et al. .................. 704/3 |
| 6,549,922 | B1 | | 4/2003 | Srivastava et al. ........... 707/205 |
| 6,604,104 | B1 | * | 8/2003 | Smith ........................... 707/10 |
| 6,799,184 | B2 | | 9/2004 | Bhatt et al. ................... 707/102 |
| 2003/0069881 | A1 | | 4/2003 | Huttunen ....................... 707/5 |
| 2003/0237046 | A1 | | 12/2003 | Parker et al. ................. 715/513 |

(Continued)

FOREIGN PATENT DOCUMENTS

CN          1195359 C       3/2005

(Continued)

OTHER PUBLICATIONS

SVL920050142CN1 Office Action, Application No. 2006101669329, Dec. 21, 2007, English version.

(Continued)

*Primary Examiner*—Charles Rones
*Assistant Examiner*—Daniel Kuddus
(74) *Attorney, Agent, or Firm*—Kunzler & McKenzie

(57) ABSTRACT

An apparatus, system, and method are disclosed for synchronizing change histories in enterprise applications. An access module accesses a source data object container provided by a source EIS and a destination data object container provided by a destination EIS. The source data object container comprises a source change history, and the destination data object container comprises a destination change history. A transformation module may retrieve a transformation definition from an integration server, or the transformation definition may be provided in some other fashion. An interpretation module interprets the transformation definition to determine the relationships between the source data object container and the destination data object container. A copy module may copy select portions of the source change history to the destination change history.

18 Claims, 6 Drawing Sheets

U.S. PATENT DOCUMENTS

| | | | |
|---|---|---|---|
| 2004/0019499 A1* | 1/2004 | Murashita | 705/1 |
| 2005/0010891 A1 | 1/2005 | Chaiken et al. | 717/100 |
| 2005/0027664 A1 | 2/2005 | Johnson et al. | 706/12 |
| 2006/0195816 A1* | 8/2006 | Grandcolas et al. | 717/101 |

FOREIGN PATENT DOCUMENTS

| | | |
|---|---|---|
| WO | WO03/091182 | 11/2003 |
| WO | WO03/091827 | 11/2003 |

OTHER PUBLICATIONS

SVL920050142CN1 Office Action, Application No. 2006101669329, Dec. 21, 2007, Chinese version.

Beatty et al., "Service Data Objects", IBM Corp. and BEA Systems, Inc., Version 2.0, Jun. 2005.

Client Application Developer's Guide, http://e-docs.bea.com/aldsp/docs20/appdev/sdo.html, 2005.

* cited by examiner

APPARATUS, SYSTEM, AND METHOD FOR SYNCHRONIZING CHANGE HISTORIES IN ENTERPRISE APPLICATIONS

BACKGROUND OF THE INVENTION

1. Field of the Invention

This invention relates to enterprise application integration, and more particularly relates to synchronization of business objects between enterprise applications.

2. Description of the Related Art

The business object is a standard form of data storage and transfer in enterprise information systems (EISs) today. The business object structure is defined by a business object definition, and a particular business object with data included is called an instance of the business object. These business object instances are the standard method of transferring information between EISs of different types. Since EISs of different types are likely to have different business object definitions, an application which integrates EISs of different types must transform the business object instance contents between the two EISs to match the business object definitions on each side, and ensure that the same data is properly reflected on each side.

Synchronization is a specific pattern of integrating information between EISs. Synchronization requires that any change in a set of business objects within one EIS be reflected within the equivalent set of business objects within another EIS. This requires more than merely passing business object instances between the two EISs. For example, if the business object instances for a given system represent customer orders, a deletion of a customer order on a first EIS must be reflected as a deletion of the same order on the second EIS. Likewise, removal or changes of information within an order in the first EIS must be reflected as such in the second EIS.

The current method of enacting synchronization is to pass business object instances with instance level annotations. These annotations note that the instance has changed, and what change needs to be enacted in the target EIS. In one example, these annotations are called "verbs." In another example, these annotations are in data fields accompanying a business object instance, called a change summary. This change information (i.e. "verbs," "change summary," and the like) used for synchronizing business object instances is referred to herein as the "change history" to avoid confusion with implementation-specific terms used in the art.

Current synchronizations between EISs require that an integration developer write transformation definitions and rules. These transformation rules and definitions relate specifically to transformations of data object attributes, or "field level" transformations. For example, an attribute "fullname" in a source data object may need to be changed to two attributes, "firstname" and "lastname" in a destination data object.

The protocol and complexity of change history information may require integration software or script developers to write transformations for change history information in order to maintain interoperability as data structures storing change history become more complex. For example, an attribute for a source data object may have a change in the change history with the annotation "update," while the equivalent annotation in the destination data object might be "delete." Thus, writing transformation instructions for change histories increases the work load for the integration developer. This problem is exacerbated as the change histories become more complex. Unfortunately, conventional integration servers do not perform automatic transformation of change histories. Currently, the only way to perform change history transformations is for the integration developer to manually write such annotation transformations.

Another problem is that the change history information may not currently be transferred to the destination. For example, a change in a source data object may cause the annotation verb to say update, but then after passing through the integration server, the destination object may have no verb (or at least not an update verb) but instead the changes may have already been made to the fields such that the destination EIS simply copies all fields regardless of whether a particular field has actually changed or not. This adds time and consumes resources to perform unnecessary copies. This transfer of information could be done more efficiently if the change history about specific fields that have changed was communicated to the destination EIS.

From the foregoing discussion, it should be apparent that a need exists for an apparatus, system, and method that automatically detects, preserves, and propagates change histories between EISs. Beneficially, such an apparatus, system, and method would perform these functions for field level moves and copies, as well as child-object level moves and copies.

SUMMARY OF THE INVENTION

The present invention has been developed in response to the present state of the art, and in particular, in response to the problems and needs in the art that have not yet been fully solved by currently available enterprise application integration servers. Accordingly, the present invention has been developed to provide an apparatus, system, and method for synchronizing change histories that overcome many or all of the above-discussed shortcomings in the art.

A system of the present invention is also presented to synchronize change histories between a source EIS and a destination EIS. The system may be embodied by a source EIS, a destination EIS, and an integration server. In one embodiment, the source EIS comprises a source data graph including a set of source data objects and a source change history. The set of source data objects may be organized into a source data object tree. In one embodiment, the destination EIS comprises a destination data graph including a set of destination data objects and a destination change history. The set of source data objects may be organized into a destination data object tree. The integration server, in one embodiment, comprises a processor, an input/output (I/O) device, and a memory device.

The memory device of the system may include an interpretation module, an access module, a copy module, and a transformation module. In one embodiment, the transformation module is configured to retrieve a transformation definition. In one embodiment, the interpretation module is configured to interpret the transformation definition and determine the relationships of the set of source data objects to the set of destination data objects. In one embodiment, the access module is configured to use the I/O device to access the source data graph and the destination data graph. The copy module, in one embodiment, is configured to copy select portions of the source change history to the destination change history. Alternatively, the copy module, in one embodiment, is configured to copy substantially all of the source change history to the destination change history.

A method of the present invention is also presented for synchronizing change histories. The method in the disclosed embodiments substantially includes the steps necessary to carry out the functions presented above with respect to the operation of the described apparatus and system. In one embodiment, the method includes accessing a source data object container and a destination data object container. The method also may include interpreting transformations between the source and destination object containers, and copying select entries of a source change history to a destination change history.

In a further embodiment, the method includes determining the source and destination data object trees, and copying aspects of source descendent objects to the appropriate locations within the destination data object container. In one embodiment, the method further includes finding deleted objects and deleted object attributes in the source change history, and copying those deleted objects and deleted object attributes to the destination change history. In a further embodiment, the method further includes ordering entries in the destination change history to reflect the order of entries in the source change history. In particular, ordering may include preserving a hierarchical ordering between the source change history and the destination change history. In one embodiment, the source data object container and destination data object container comprise a source data graph and a destination data graph.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
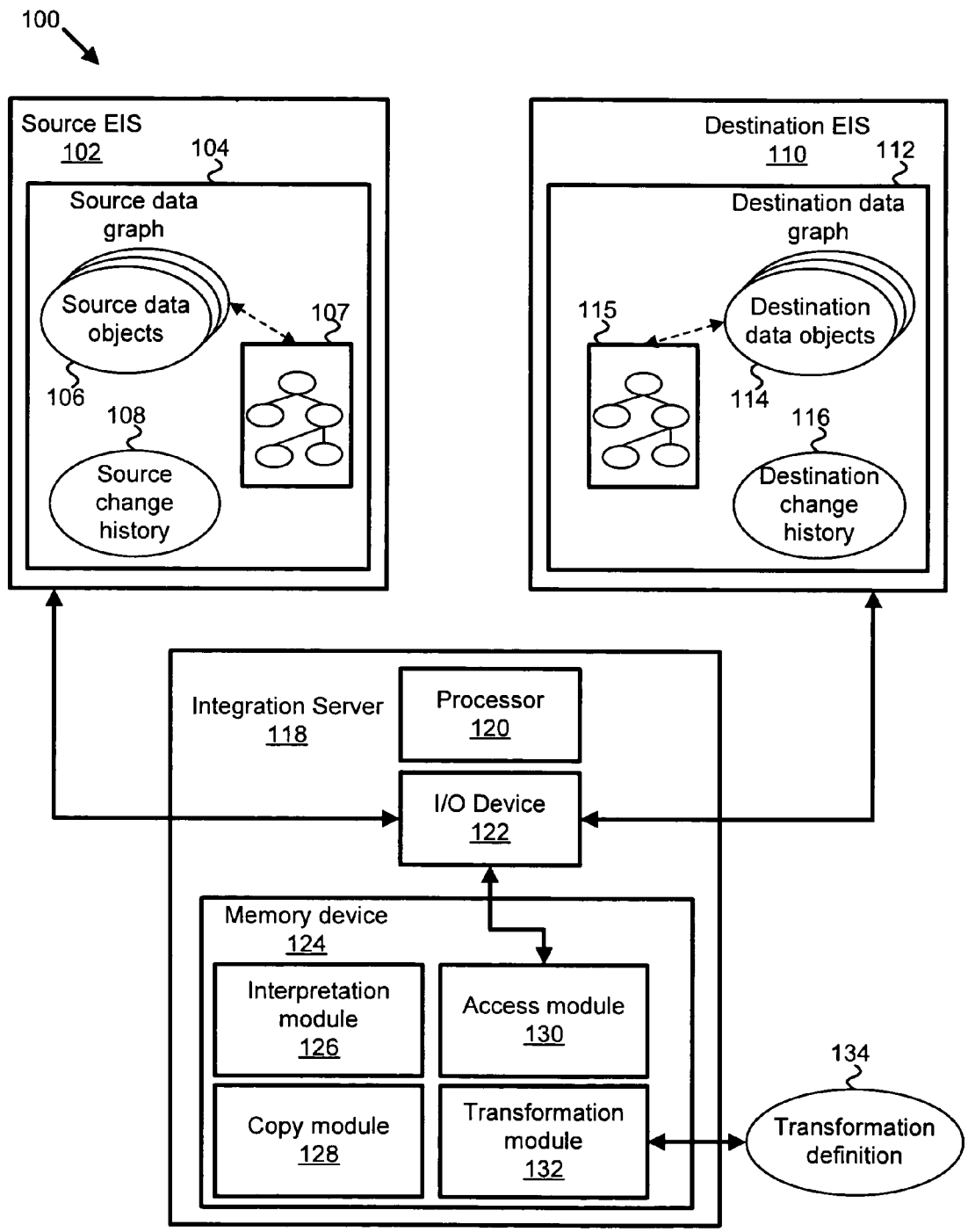
FIG. 1 is a schematic block diagram illustrating one embodiment of a system to synchronize change histories in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 to synchronize change histories of integration business objects between a source EIS 102 and a destination EIS 110 in accordance with the present invention. The system 100 comprises, in one embodiment, a source EIS 102, a destination EIS 110, and an integration server 118.

In one embodiment, the source EIS 102 comprises a source data object container 104, which may be a source data graph 104. The source data graph 104, in one embodiment, comprises a set of source data objects 106, and a source change history 108. Each member of the set of source data objects 106 comprise one or more attributes, which contain source data object instance data. Some members of the set of source data objects 106 may be interrelated in a parent-child relationship to each other. A source data object tree 107 may store these relationships. Alternatively, the set of source data objects 106 may be organized in to a source data object tree structure 107.

In one embodiment, the source data graph 104 further comprises a source change history 108 associated with the set of source data objects 106. The source change history 108, in one embodiment, stores change history information about the set of source data objects 106. In one embodiment, the source change history 108 stores insertions, updates, and deletions to attributes and/or source data objects of the set of source data objects 106. In a further embodiment, the source change history 108 stores insertions, updates, and deletions to attributes and/or source data objects of the set of source data objects 106 in a positional relationship parallel to the source data object tree 107 of the set of source data objects 106. In a further embodiment, the source change history 108 stores a list of one or more deleted source data objects that no longer appear in the set of source data objects 106 or the source data object tree 107.

In one embodiment, the destination EIS 110 comprises a destination data object container 112, which may be a destination data graph 112. The destination data graph 112, in one embodiment, comprises a set of destination data objects 114, and a destination change history 116. Each member of the set of destination data objects 114 comprise one or more attributes, which contain destination data object instance data. Some members of the set of destination data objects 114 may be interrelated in a parent-child relationship to each other. A destination data object tree 115 may store these relationships. Alternatively, the set of destination data objects 114 may be organized in to a destination data object tree structure 115.

In one embodiment, the destination data graph 112 further comprises a destination change history 116 associated with the set of destination data objects 114. The destination change history 116, in one embodiment, stores change history information about the set of destination data objects 114. In one embodiment, the destination change history 116 stores insertions, updates, and deletions to attributes and/or destination data objects of the set of destination data objects 114. In a further embodiment, the destination change history 116 stores insertions, updates, and deletions to attributes of the set of destination data objects 114 in a positional relationship parallel to the destination data object tree 115 of the set of destination data objects 114. In a further embodiment, the destination change history 116 stores a list of one or more deleted destination data objects that no longer appear in the set of destination data objects 114 or the destination data object tree 115.

The integration server 118 comprises, in one embodiment, a processor 120, an I/O device 122, and a memory device 124. In one embodiment, the processor 120 is the central processing unit (CPU) of a computer, and is the processor 120 responsible for running the computing tasks of the integration server 118. In one embodiment, the I/O device 122 is a network adapter configured to communicate with the source EIS 102 and the destination EIS 110 over a network. In one embodiment, the memory device 124 accesses executable computer code to perform the operations of the integrations server 118.

The memory device 124 comprises, in one embodiment, an interpretation module 126, a copy module 128, and an access module 130. In a further embodiment, the memory device 124 comprises a transformation module 132, configured to retrieve a data object transformation definition 134.

The interpretation module 126 is configured, in one embodiment, to interpret one or more transformations defined between source attributes of one of the set of source data objects 106 and destination attributes of one of the set of destination data objects 114. The one or more transformations describe, in one embodiment, which attributes and data objects from the source EIS 102 correspond to attributes and data objects from the destination EIS 110.

For example, one attribute from one of the set of source data objects 106 may correspond to one or more attributes from one of the set of destination data objects 114. The source attribute may be divided out into two destination attributes. In another example, a plurality of attributes from one or more of the set of source data objects 106 may correspond to one or more attributes from one of the set of destination data objects 114. Multiple source attributes may combine into a single destination attribute.

In another example, one member of the set of source data objects 106 may correspond to one member of the set of destination data objects 114. These examples are intended to illustrate embodiments of the transformation concept. Other transformation relationships exist and are understood to come within the scope of the present invention. In one embodiment, the one or more transformations are stored in the memory device 124. In another embodiment, the one or more transformations are provided by the transformation module 132.

The copy module 128 is configured, in one embodiment, to copy select source entries from the source change history 108 to the destination change history 116. Alternatively, the copy module 128 is configured to copy a whole source change history 108 to the destination data graph 112 to take the place of the destination change history 116.

In one embodiment, the copy module 128 is configured to select the entries from the source change history 108 that relate to one of the source data objects 106 that has a relationship defined in the one or more transformations interpreted by the interpretation module 126. In a further embodiment, the copy module 128 is configured to copy deleted attributes from the set of source data objects 106, stored in the source change history 108, to the destination change history 116, in accordance with the one or more transformations.

For example, if a source data object "A" 106 has a deleted attribute "Alpha," and the one or more transformations indicate that the corresponding destination data object is "B" 114, with the corresponding attribute "Beta," the copy module 128 may copy to the destination change history 116 that attribute "Beta" is deleted from the destination data object "B." However, if source data object "A" has a deleted attribute "Alpha," and none of the transformations indicate that there is no corresponding destination data object or attribute, the copy module 128 will not copy the deletion entry from the source change history 108 to the destination change history 116.

The copy module 128 is further configured, in one embodiment, to copy deleted source data objects from the source change history 108 that have a relationship defined in the one or more transformations interpreted by the interpretation module 126. For example, if the source data object "A" no longer appears in the set of source data objects 106, and has a deletion entry in the source change history 108, while the one or more transformations indicate that the corresponding destination data object is destination data object "B," the copy module 128 may copy to the destination change history 116 a deletion entry that the destination data object "B" is deleted.

The copy module 128 is further configured, in one embodiment, to copy source entries from the source change history 108 to the destination change history 116, where the entries relate to descendent source data objects in the source data object tree 107. The copy module 128 is further configured, in one embodiment, to copy source entries from the source change history 108 to destination entries in the destination change history 116, such that the position of the source entry in the source change history 108 corresponds to the position of the destination entry in the destination change history 116. The ordered entries may improve the speed of searching algorithms, assist with backwards compatibility, ease the workload of parsing routines that may read and interpret the change histories 108, 116, and support semantic correctness. Semantic correctness is the proper positioning of entries for an EIS that utilizes position to indicate semantic meaning and thereby streamline data size and access speed. For example, some EISs may always put a default phone number at entry position #1, a home phone number at entry position #2, and so forth.

The access module 130 is configured, in one embodiment, to receive the source data graph 104 from the source EIS 102 and to transmit the destination data graph 112 to the destination EIS 110. In one embodiment, the access module 130 is configured to communicate with the source EIS 102 and the destination EIS 110 through the I/O device 122.

The access module 130, in one embodiment, is configured to use a variety of communication protocols and/or satisfy a variety of EIS-specific data configurations as required for the system 100. In one embodiment, the access module 130 converts a first proprietary data graph 104 from the source EIS 102 to a generic data graph, allows the integration server 118 to process the generic data graph, and converts the processed generic data graph to a second proprietary data graph 112 for the destination EIS 110. For example, in one embodiment the source EIS 102 may be a SAP® server, the destination EIS 110 may be a PeopleSoft® server, and the access module 130 converts data graphs from these servers to a generic data graph that may be represented in an XML schema for use by the integration server 118.

The transformation module 132 is configured, in one embodiment, to retrieve a data object transformation definition 134 that defines the one or more transformations between source data objects 106 and destination data objects 114. In one embodiment, the transformation definition 134 comprises a data object map definition. The data object map definition defines which attributes of the set of source data objects 106 correspond to which attributes of the set of destination objects 114. The data object map definition also defines how data values in a source data object 106 are to be transformed or altered before storing the data value in the destination data object 114. In one embodiment, the transformation definition 134 comprises a data object relationship definition. In one embodiment, the data object relationship defines which of the set of source data objects 106 correspond to which of the set of destination data objects 114.

In certain embodiments, the transformation module 132 is configured to retrieve a pair of data object transformation definitions 134 that defines the one or more transformations between source data objects 106 and destination data objects 114. One data object transformation definition 134 defines transformations between a source data object 106 and a generic data object. A second data object transformation definition 134 defines transformations between a generic data object and a destination data object 114.

Figure 2:
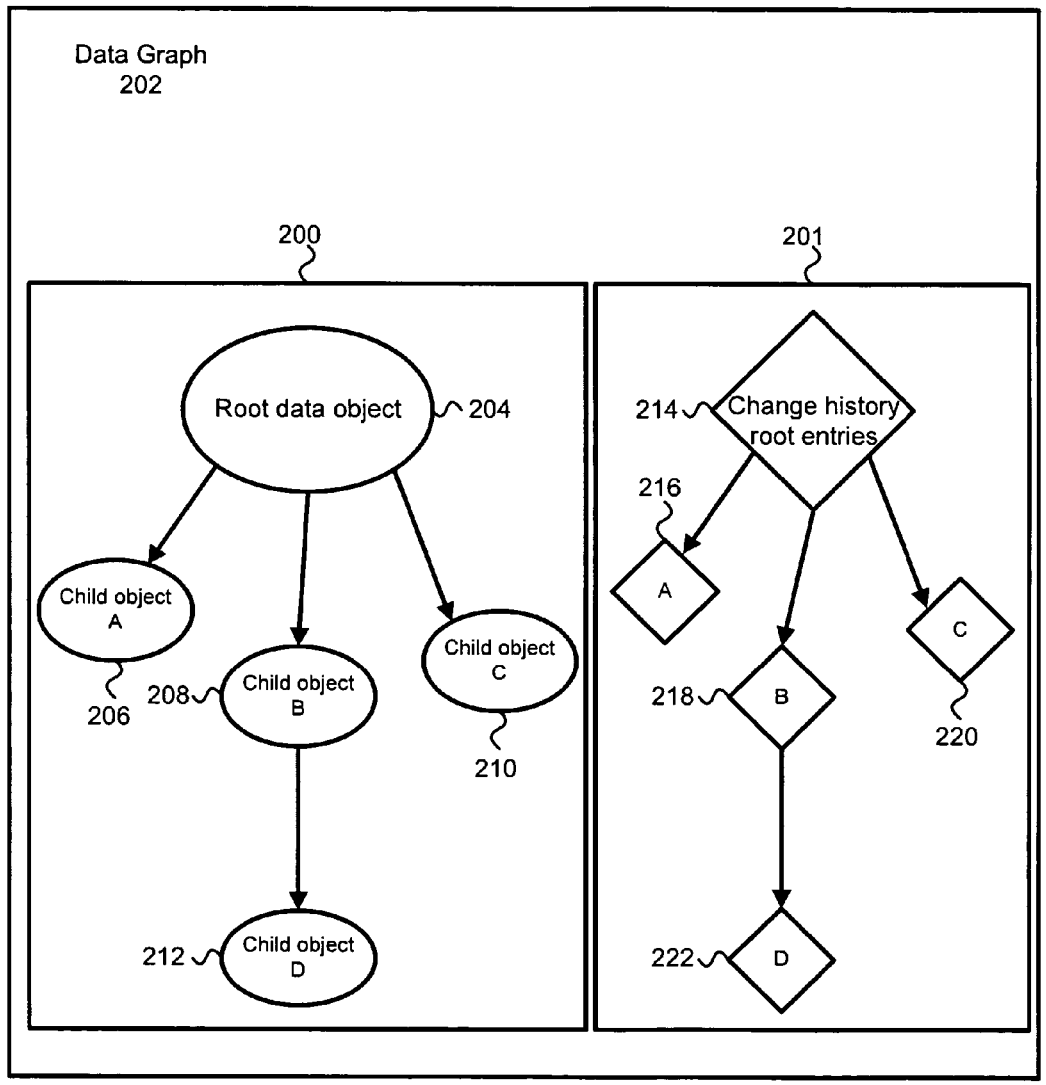
FIG. 2 is a schematic block diagram illustrating one embodiment of a data graph in accordance with the present invention.

FIG. 2 illustrates one embodiment of a data graph 202 in accordance with the present invention. The data graph 202 comprises, in one embodiment, a set of data objects 200 and a change history 201. In one embodiment, the set of data objects 200 comprises a source set of data objects. Alternatively, the set of data objects 200 comprises a destination set of data objects. In one embodiment, the change history 201 comprises a source change history. Alternatively, the change history 201 comprises a destination change history.

The set of data objects 200 may comprise a root data object 204. The root data object 204 may comprise attributes with associated data values. In one embodiment, the root data object 204 includes child objects A 206, B 208, and C 210. The child objects A 206, B 208, and C 210 may comprise attributes with associated data values. In one embodiment, the child object B 208 comprises a descendent child object D 212. The exemplary set of data objects 200 shown is one embodiment for illustration only, and a root data object 204 may have any number of child objects A 206, B 208, and C 210. Alternatively, the root data object 204 may include no attributes or data values and instead serves a place holder for defining the hierarchy between child objects A 206, B 208, and C 210.

The change history 201 records information about changes in the data values and/or additions of data objects 200. Changes may include insertion, modification, or deletion of data values and/or data objects 200. To facilitate tracking of these changes, the change history 201 may be organized according to the same hierarchical structure and order as the data objects 200 as defined in the data object tree structure 107, 115.

In one embodiment, the change history 201 comprises change history root entries 214 corresponding to the root data object 204. The change history 201 further comprises, in one embodiment, change history child entries A 216, B 218, and C 220 corresponding to the set of data objects 200 and child objects A 206, B 208, and C 210. In one embodiment, the change history 201 further comprises a change history descendent child entry D 222. In one embodiment, each object within the set of data objects 200 that has experienced a change in data value or membership of data objects has a corresponding entry within the change history 201. In one embodiment, the existence of a child change history entry 216, 218, 220, 222 may not require that a parent or ancestor change exist, instead a parent or ancestor change entry 214 or 218 may exist simply to indicate the hierarchical position of the descendent change entries 216, 218, 220, 222. Similarly, the existence of a child change history entry 216, 218, 220, 222 may not require that a parent or ancestor change exist.

Figure 3:
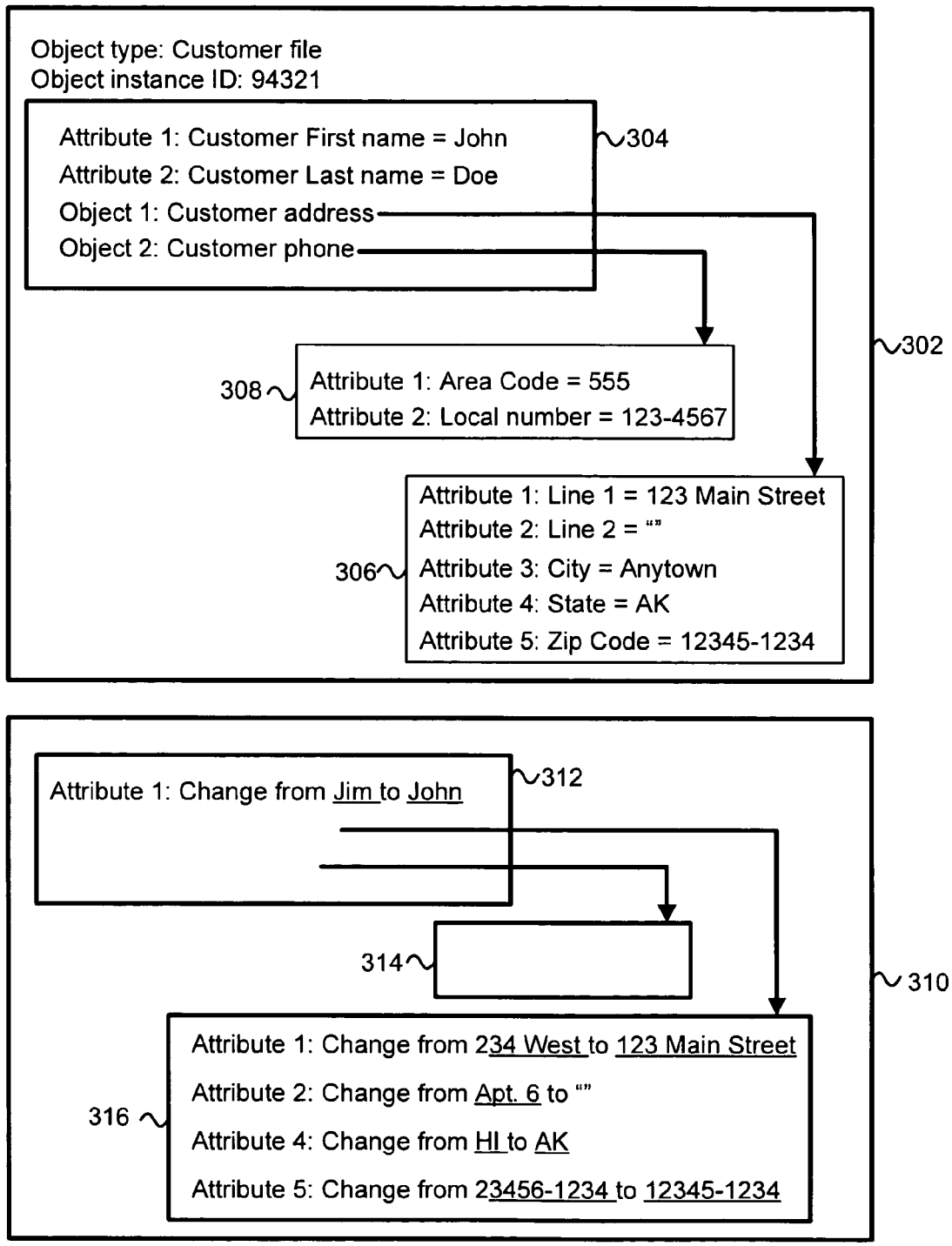
FIG. 3 is a schematic block diagram illustrating one embodiment of a business object instance and corresponding change history in accordance with the present invention.

FIG. 3 illustrates one embodiment of a set of data objects 302 and a change history 310 in accordance with the present invention. The set of data object 302 comprises, in one embodiment, a root data object 304, a first child object 306 and a second child object 308. The root data object 304 comprises, in one embodiment, a first attribute with the title "Customer First name" and the value "John," a second attribute with the title "Customer Last name" and the value "Doe," a first child object 306 with the title "Customer address," and a second child object 308 with the title "Customer phone." The first child object 306 comprises, in one embodiment, five attributes with the titles and values indicated. The second child object 308 comprises, in one embodiment, two attributes with the titles and values indicated.

The change history 310 comprises, in one embodiment, a change history root entry 312 corresponding to the root data object 304. The change history root entry 312 indicates, in one embodiment, that the value for attribute 1 of the root data object 304 has changed from "Jim" to "John." The root data object 304 includes the new data value and the change history root entry 312 includes the new data value and the old data value.

The change history 310 comprises, in one embodiment, a change history first child entry 316 corresponding to the first child object 306. The change history first child entry 316 indicates the changes to certain attributes of the first child object 306 as shown. For example, the change history first child entry 316 indicates that attribute 4 has changed from "HI" to "AK." In the example, the change history first child entry 316 does not indicate a change for attribute 3 of the first child object 306.

The change history 310 comprises, in one embodiment, a change history second child entry 314 corresponding to the second child object 308. The change history second child entry 314 indicates, in one embodiment, that the second child object 308 has not changed. In one embodiment, the change history second child entry 314 is omitted from the change history 310.

Figure 4:
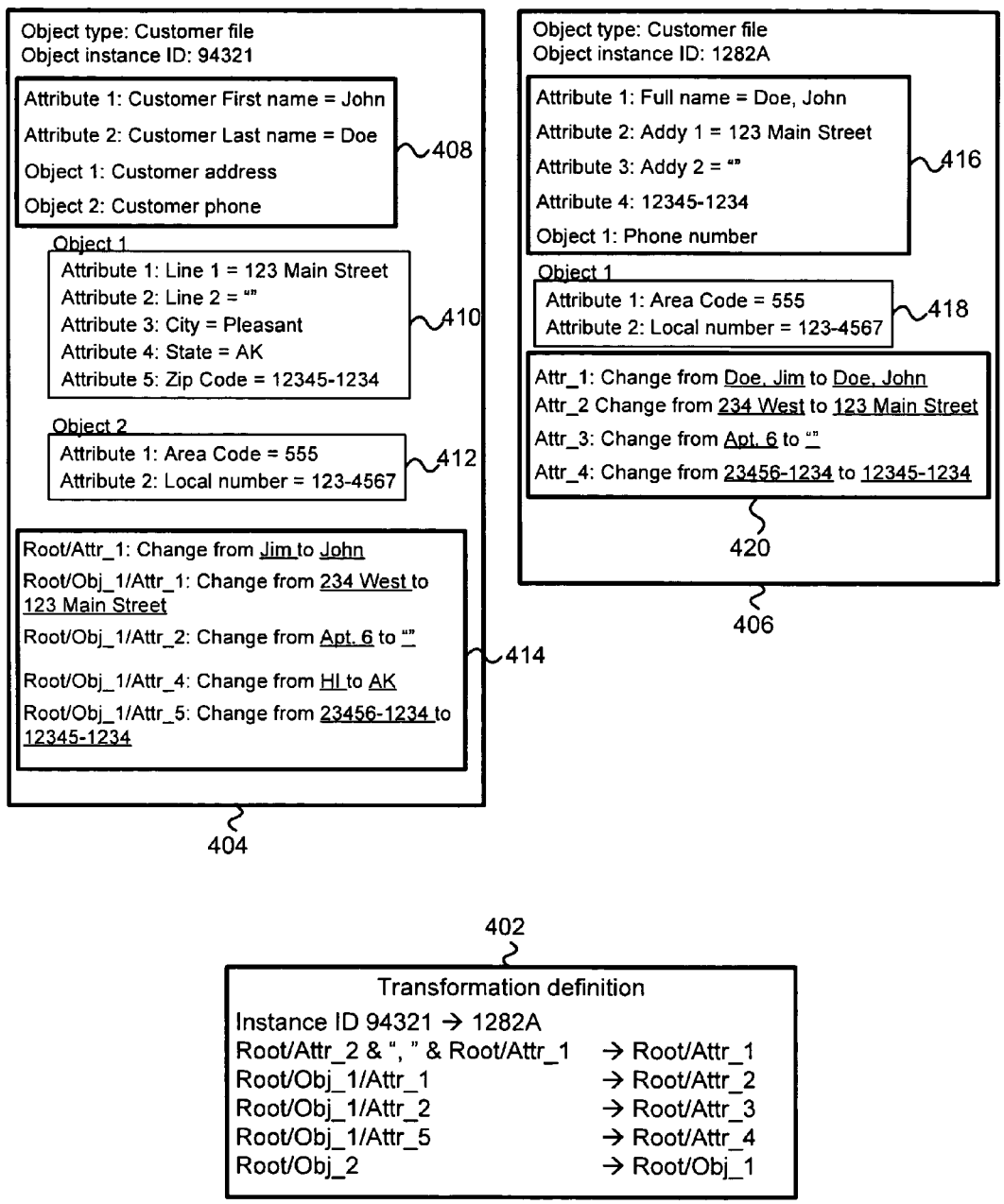
FIG. 4 is a schematic block diagram illustrating one embodiment of a transformation definition in accordance with the present invention.

FIG. 4 illustrates one embodiment of a transformation definition 402 in accordance with the present invention. The illustration of FIG. 4 further illustrates a source set of data objects 408, 410, 412 and a source change history 414, and a destination set of data objects 416, 418 and a destination change history 420. The source set of data objects 408, 410, 412 and the source change history 414 comprise the same information, for purposes of illustration, as the set of data objects 302 and change history 310 from FIG. 3. The source set of data objects 408, 410, 412 and source change history 420 are included within a source data graph 404, or source data object container, in one embodiment. The destination set of data objects 416, 418 and destination change history 420 are included within the destination data graph 406, or destination data object container, in one embodiment.

The transformation definition 402 indicates, in one embodiment, that the instance ID for the source data graph 404 "94321" should be "1282A" in the destination data graph 406. The instance ID as indicated in FIG. 4 may be a system-derived parameter, for example the object type "customer file" in the source EIS may have a system-derived ID of "94321" while the object type "customer file" in the destination EIS may have a system-derived ID of "1282A." A system-derived parameter is utilized by the EIS and may not be visible to the user. For example, an object instance may have an attribute associated indicating the local time of an electronic trading transaction. The source EIS 404 may record the local time associated with the source EIS 404 into an attribute of the source data object 106 storing the transaction. Transforming the electronic trading transaction to the destination EIS 406 may include recording the local time associated with the destination EIS 406 into an attribute of the destination data object 114 storing the transaction, and that transformation of a system-derived parameter may be inaccessible to the integration developer. In one embodiment, an integration developer provides the transformation definition 402, and the instance ID is available to the integration developer and included on the transformation definition 402.

The transformation definition 402 further indicates that the source root object 408, attribute 2, should be concatenated with a comma-space, and then concatenated with the source root object 408, attribute 1, and the result should be entered into the destination root object, attribute 1. This transformation is illustrated in the destination root object 416, where the value is indicated as "Doe, John." The final entry of the transformation definition 402 indicates that the source child object 2 412 maps directly to the destination child object 1 418.

In one embodiment, the destination change history 420 reflects only those entries in the source change history 414 that are set forth in the transformation definition 402. For example, the destination change history 420 contains entries for all destination root object 416 attribute changes reflected by the equivalent change entries in the source change history 414, provided that destination root object 416 attribute is defined in the transformation definition 402. The source change history 414 indicates a change for source child object 1 410, attribute 4, from "HI" to "AK," which is not reflected in the destination change history 420 because that attribute is not in the transformation definition 402, or used in the destination data graph 406.

In one embodiment, the source change history 414 may use the protocol that the object of the change, e.g. "Root object" or "Obj. 1" is listed in the entry, while the destination change history 420 may use the protocol that the object of the change need not be listed if the target object is the destination root object 416. The naming protocols for the source data graph 404 and the destination data graph 406 need not be identical, and need not be the same as those listed in the example.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
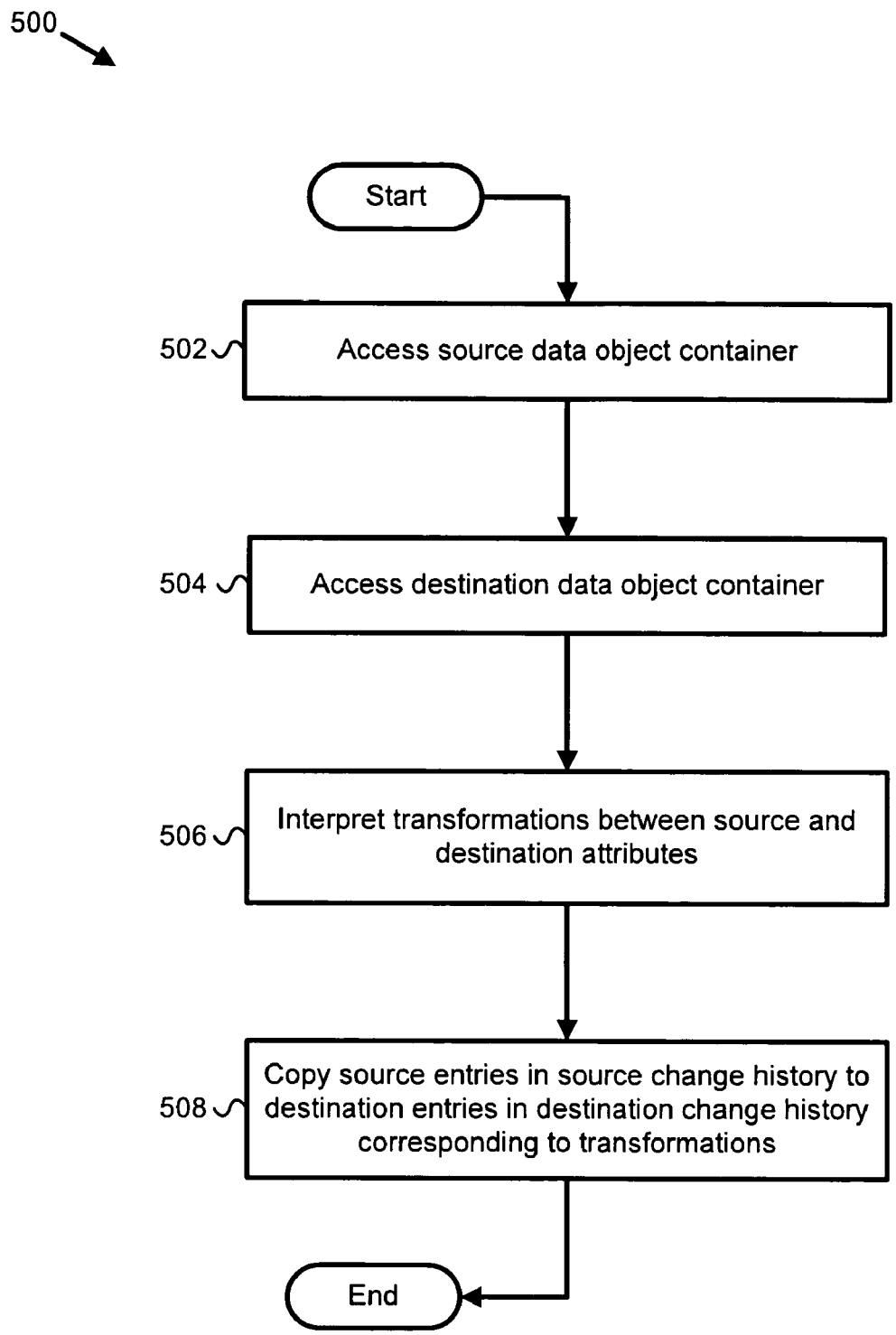
FIG. 5 is a schematic flow chart diagram illustrating one embodiment of a method to synchronize change histories in accordance with the present invention.

FIG. 5 is a schematic flow chart diagram illustrating one embodiment of a method 500 to synchronize change histories between a source EIS and a destination EIS in accordance with the present invention. In one embodiment, an access module 130 accesses 502 a source data object container 404. The source data object container 404 may reside in memory, in a repository, on a storage device, or on a remote server. Next, the access module 130 accesses 504 a destination data object container 406. Similarly, the destination data object container 406 may reside in memory, in a repository, on a storage device, or on a remote server.

Next, the interpretation module 126 interprets 506 transformations between source attributes associated with a set of source data objects 106 in the source data object container 104, and a set of destination attributes associated with a set of destination data objects 114 in the destination data object container 112. In one embodiment, the interpretation module 126 communicates with the transformation module 132 to locate a transformation definition 134.

Next, the copy module 128 copies 508 source entries and/or source objects in a source change history 108 to destination entries and/or destination objects in a destination change history 116 according to the transformation definition 134. In one embodiment, copying 508 source entries in a source change history 108 to destination entries in a destination change history 116 comprises copying the entire source change history 108 over top of the destination change history 116.

Figure 6:
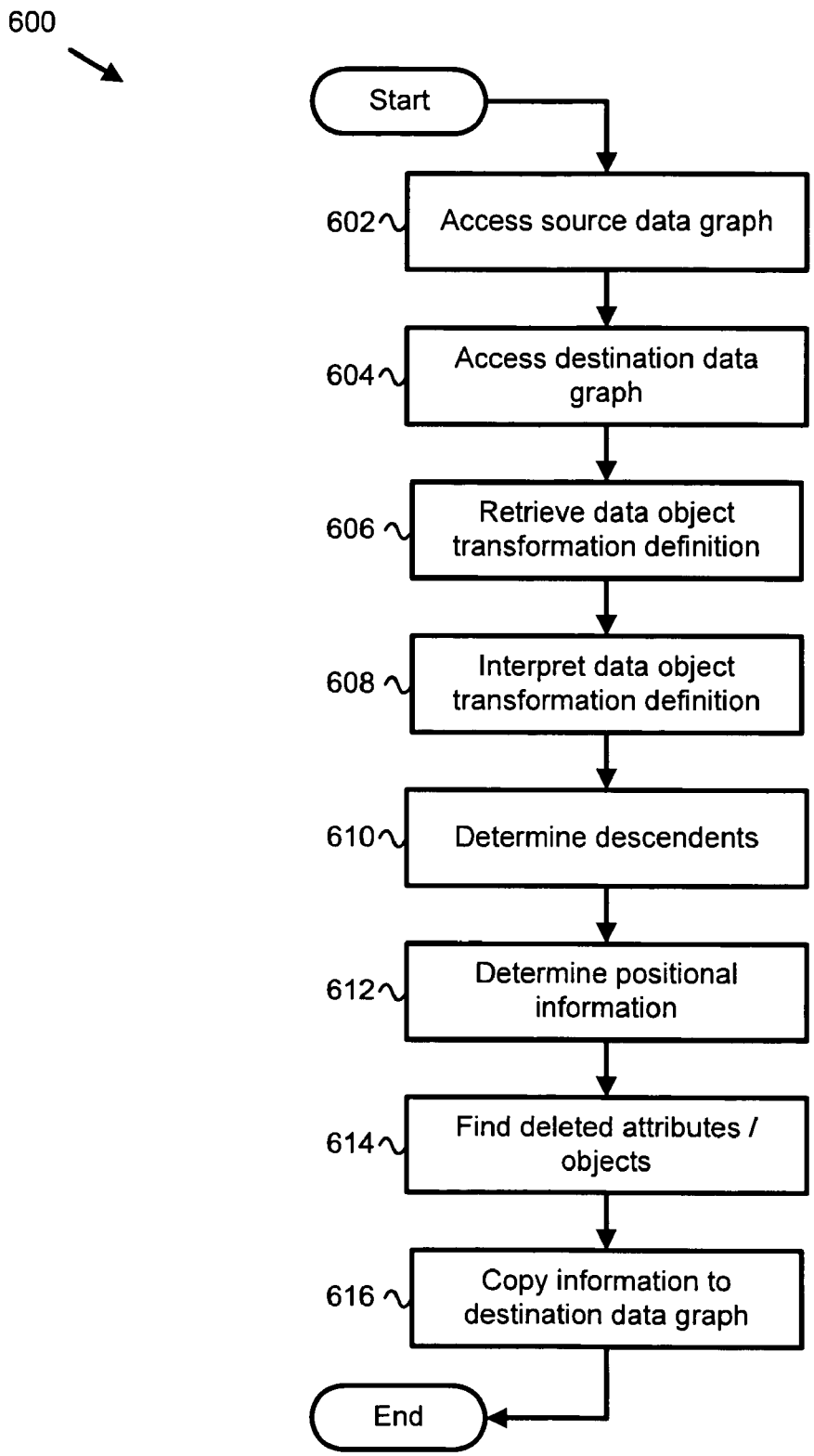
FIG. 6 is a schematic flow chart diagram illustrating one embodiment of a method to synchronize change histories in accordance with the present invention.

FIG. 6 is a schematic flow chart diagram illustrating one embodiment of a method 600 to synchronize change histories between a source EIS and a destination EIS in accordance with the present invention. Initially, an access module 130 accesses 602 a source data graph 104. The access module 130 also accesses 604 a destination data graph 112. The transformation module 132 retrieves 606 a transformation definition 134. The transformation module 132 may identify the transformation definition based on a naming convention or name match between the source data graph 104 and the transformation definition 134. The transformation module 132 provides the transformation definition to the interpretation module 126. The interpretation module 126 interprets 608 the transformation definition 134 to determine how a set of source data objects 106 in the source data graph 104 relate to a set of destination data objects 114 in the destination data graph 112. Interpreting the transformation definition 134 further includes, in one embodiment, determining how a source change history 108 relates to a destination change history 116.

The interpretation module 126 determines 610 entries from the source change history 108 relating to descendent data objects within the set of source data objects 106 using one or more transformation definitions 134. The interpretation module 126 also determines 610 corresponding entries for the destination change history 116 relating to data objects within the set of destination data objects 114. The corresponding entries may relate to descendent destination data objects or to attributes of certain destination data objects 114.

In certain embodiments, the interpretation module 126 determines 612 positional information for source entries within the source change history 108, and corresponding positional information for destination entries within the destination change history 116. The positional information may be used to retain a hierarchical relationship among entries of a source change history 108 and a destination change history 116.

In one embodiment, the interpretation module 126 finds 614 deleted source attributes and/or objects for one or more source data objects in the source change history 108, and determines corresponding deleted destination attributes and/or objects for one or more destination data objects in the set of destination data objects 114 for the destination change history 116. In one embodiment, the deleted source attributes and/or objects are stored in the source change history 108. Consequently, deleted object information and/or a deleted destination attribute corresponding to the deleted source attribute is stored in the destination change history 116. Advantageously, preservation of deleted attribute values and objects allows the destination EIS 110 to revert the deletion changes if needed.

Next, the copy module 128 copies 616 the source entries from the source change history 108 to the corresponding destination entries for the destination change history 116, in one embodiment. In one embodiment, copying 616 the source entries comprises copying the source change entries corresponding to the transformation definition 134, the determined 610 descendent source data objects, and the deleted attributes and or objects found 614 by the interpretation module 126. In a further embodiment, copying 616 the source entries further comprises copying 616 the source entries such that the order and position of the source entries in the source change history 108 is reflected in the order and position of the destination entries in the destination change history 116.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method to synchronize change histories of business objects between a source enterprise information system (EIS) and a destination EIS, the method comprising:

accessing, by way of a processor and a memory, a source business object having at least one source data object and a hierarchical source change history associated with the at least one source data object, wherein the at least one source data object comprises a source data graph, the hierarchical source change history corresponding to a hierarchical structure of the at least one source data object, the source business object configured to integrate a source EIS and a destination EIS, the source EIS and the destination EIS comprising disparate data systems, the hierarchical source change history configured to store a set of change operations that define change information for the at least one source data object, the hierarchical source change history residing on the source EIS;

accessing a destination business object having at least one destination data object and a hierarchical destination change history associated with the at least one destination data object, the hierarchical destination change history corresponding to a hierarchical structure of the at least one destination data object, the hierarchical destination change history configured to store a set of change operations that define change information for the at least one destination data object, the hierarchical destination change history residing on the destination EIS, wherein the at least one destination data object comprises a destination data graph;

interpreting one or more transformations between source attributes of the at least one source data object and destination attributes of the at least one destination data object, the one or more transformations defining a mapping between a source change history entry and a destination change history entry; and copying source entries in the hierarchical source change history to the hierarchical destination change history in the destination business object, the source entries corresponding to source attributes defined in the one or more transformations, wherein each of the hierarchical source change history and the hierarchical destination change history comprises a hierarchical structure of change history entries.

2. The method of claim 1, wherein copying source entries further comprises determining a position of each source entry in the hierarchical source change history and copying the source entries to the hierarchical destination change history such that the position of each destination entry in the hierarchical destination change history corresponds to the position of each source entry in the hierarchical source change history.

3. The method of claim 1, further comprising copying source entries in the hierarchical source change history to the hierarchical destination change history in the destination business object, the source entries corresponding to descendent data objects defined in the one or more transformations.

4. The method of claim 1, wherein copying source entries further comprises determining a position of each source entry in the hierarchical source change history and copying the source entries to the hierarchical destination change history such that the position of each destination entry in the hierarchical destination change history corresponds to the position of each source entry in the hierarchical source change history.

5. The method of claim 1, wherein the hierarchical source change history comprises a deleted source attribute associated with one of the at least one source data objects, the method further comprising copying the deleted source attribute to the hierarchical destination change history according to the one or more transformations.

6. The method of claim 1, wherein the hierarchical source change history comprises a deleted source data object that is no longer a member of the source business object, the method further comprising copying the deleted source data object to the hierarchical destination change history according to the one or more transformations.

7. The method of claim 1, wherein the data object transformation definition comprises one of a data object map definition and a data object relationship definition, each defined to facilitate transformation of the source data object to the destination data object.

8. A computer program product comprising a plurality of computer executable instructions recorded on a computer readable storage medium executable by a processor to perform operations for synchronizing change histories of integration business objects between a source enterprise information system (EIS) and a destination (EIS), the operations comprising:

accessing a source data graph having a source data object and a hierarchical source change history associated with the source data object, the source data graph configured to integrate a source EIS and a destination EIS, the hierarchical source change history corresponding to a hierarchical structure of the source data object, the source EIS and the destination EIS comprising disparate data systems, the hierarchical source change history configured to store a set of change operations that define change information for the source data object, the hierarchical source change history residing on the source EIS;

accessing a destination business object having at least one destination data object and a hierarchical destination change history associated with the at least one destination data object, the hierarchical destination change history corresponding to a hierarchical structure of the at least one destination data object, the hierarchical destination change history configured to store a set of change operations that define change information for the at least one destination data object, the hierarchical destination change history residing on the destination EIS;

interpreting one or more transformations between source attributes of the source data object and destination attributes of the destination data object, the one or more transformations defining a mapping between a source change history entry and a destination change history entry;

copying select source entries in the hierarchical source change history to the hierarchical destination change history in a destination data graph, the select source entries corresponding to source attributes defined in the one or more transformations, wherein each of the hierarchical source change history and the hierarchical destination change history comprises a hierarchical structure of change history entries; and retrieving a data object transformation definition that defines the one or more transformations, the data object transformation definition comprises one of a data object map definition and a data object relationship definition, each defined to facilitate transformation of the source data object to the destination data object.

9. The computer program product of claim 8, further comprising copying source entries in the hierarchical source change history to a hierarchical destination change history in the destination data graph, the source entries corresponding to source descendent objects defined in the one or more transformations.

10. The computer program product of claim 8, wherein copying source entries further comprises determining a position of each source entry in the hierarchical source change history and copying the source entries to the hierarchical destination change history such that the position of each destination entry in the hierarchical destination change history corresponds to the position of each source entry in the hierarchical source change history.

11. The computer program product of claim 8, wherein the hierarchical source change history comprises a deleted source attribute associated with the source data object, the deleted source attribute being absent from the source data object, the method further comprising copying the deleted source attribute to the hierarchical destination change history in accordance with the one or more transformations.

12. The computer program product of claim 8, wherein the hierarchical source change history comprises a deleted source data object, the deleted source data object being absent from a source data object tree in the source data graph, the method further comprising copying the deleted source data object to the hierarchical destination change history in accordance with the one or more transformations.

13. A system to synchronize change histories of integration business objects between a source enterprise information system (EIS) and a destination (EIS), the system comprising:

a source EIS comprising a source data graph having a set of source data objects and a hierarchical source change history associated with the set of source data objects, the hierarchical source change history corresponding to a hierarchical structure of the set of source data objects, the hierarchical source change history configured to store a set of change operations that define change information for the set of source data objects;

a destination EIS comprising a destination data graph having a set of destination data objects and a hierarchical destination change history associated with the set of destination data objects, the hierarchical destination change history corresponding to a hierarchical structure of the set of destination data objects, the hierarchical destination change history configured to store a set of change operations that define change information for the set of destination data objects;

an integration server configured to communicate with the source EIS and the destination EIS over a network, the integration server comprising:

a processor;

an I/O device configured to exchange data graphs with the source EIS and the destination EIS;

a memory device having:

an interpretation module configured to interpret one or more transformations defined between source attributes of a source data object and destination attributes of a destination data object, the one or more transformations defining a mapping between a source change history entry and a destination change history entry;

a copy module configured to copy select source entries in the hierarchical source change history to the hierarchical destination change history in a destination data graph, the select source entries corresponding to source attributes defined in the one or more transformations, wherein each of the hierarchical source change history and the hierarchical destination change history comprises a hierarchical structure of change history entries;

an access module configured to receive the source data graph from the source EIS and to transmit the destination data graph to the destination EIS; and a transformation module configured to retrieve a data object transformation definition that defines at least one of the one or more transformations.

14. The system of claim 13, wherein the copy module is further configured to copy source entries in the hierarchical source change history to a hierarchical destination change history in the destination data graph, the source entries corresponding to source descendent objects defined in the one or more transformations.

15. The system of claim 13, wherein the copy module is further configured to determine a position of each source entry in the hierarchical source change history, and copy the source entries to the hierarchical destination change history such that the position of each destination entry in the hierarchical destination change history corresponds to the position of each source entry in the hierarchical source change history.

16. The system of claim 13, wherein the hierarchical source change history comprises a deleted source attribute associated with the source data object, the deleted source attribute being absent from the source data object, wherein the copy module is further configured to copy the deleted source attribute to the hierarchical destination change history in accordance with the one or more transformations.

17. The system of claim 13, wherein the hierarchical source change history comprises a deleted source data object, the deleted source data object being absent from a source data object tree in the source data graph, wherein the copy module is further configured to copy the deleted source data object to the hierarchical destination change history in accordance with the one or more transformations.

18. The system of claim 13, wherein the transformation definition comprises one of a data object map definition and a data object relationship definition, each defined to facilitate transformation of a source data object to a destination data object.

* * * * *